(No Model.)
W. WHITE.
WOOL WASHING MACHINE.
No. 413,698. Patented Oct. 29, 1889.
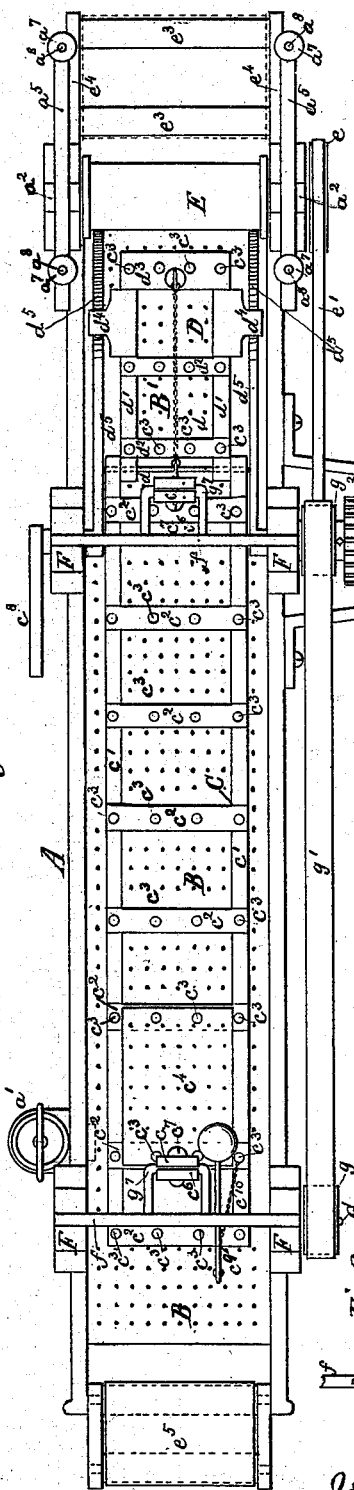
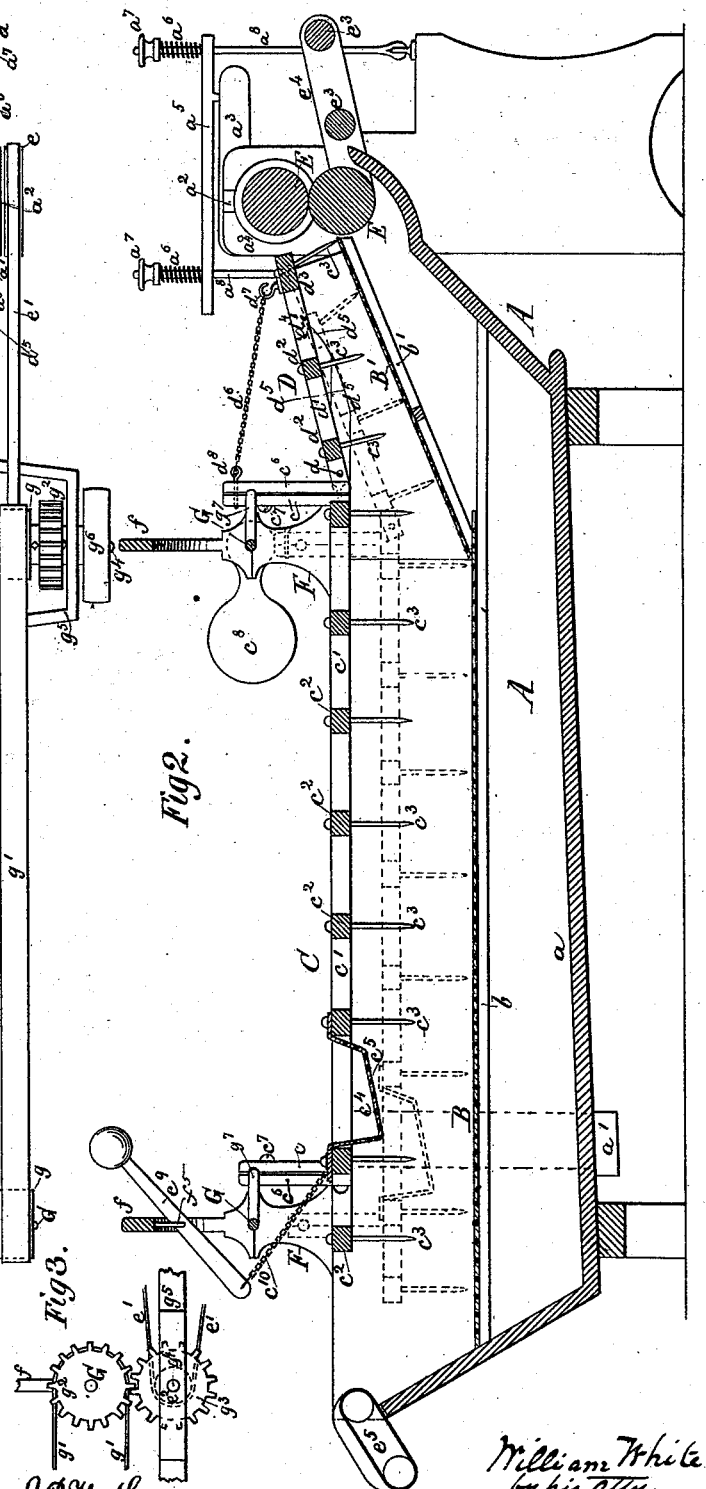
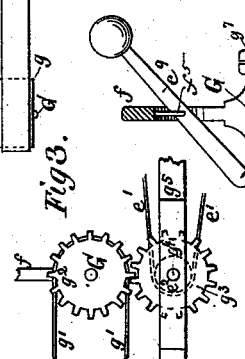
Witnesses: J. P. Theo Lang. E. T. Fenwick.
Inventor: William White by his attys Mason, Fenwick & Lawrence

UNITED STATES PATENT OFFICE.

WILLIAM WHITE, OF NASHUA, NEW HAMPSHIRE.

WOOL-WASHING MACHINE.

SPECIFICATION forming part of Letters Patent No. 413,698, dated October 29, 1889.

Application filed May 15, 1889. Serial No. 310,898. (No model.)

*To all whom it may concern:*

Be it known that I, WILLIAM WHITE, a citizen of the United States, residing at Nashua, in the county of Hillsborough and State of New Hampshire, have invented certain new and useful Improvements in Wool-Washing Machines; and I do hereby declare the following to be a full, clear, and exact description of the invention, such as will enable others skilled in the art to which it appertains to make and use the same.

My invention consists in certain constructions, combinations, and arrangement of parts, as hereinafter fully described and claimed, whereby a wool-washing machine of very simple construction and great effectiveness is produced.

In the accompanying drawings, Figure 1 is a top view of my wool-washing machine. Fig. 2 is a longitudinal section of the same, and Fig. 3 is a detail view of the driving mechanism of the same.

The letter A in the drawings represents a trough; B, a false bottom; C, a carrying and agitating rake frame; D, a delivering-rake frame, and E, wringing-rollers.

The trough A is of oblong shape, and has a bottom $a$, with a downward slope toward the front, as shown. The false bottom B is perforated, and rests upon longitudinal bars $b$, fastened to the sides of the trough. At the rear portion of the trough a sloping perforated false bottom B' is provided, the same resting upon bars $b'$ and extending up from the false bottom B to the wringing-rollers E. A pump $a'$ is attached to the side of the trough and is used to agitate the liquid in the trough from time to time. To the sides of the trough two pairs of standards F are fastened, each pair being united by an upper arched transverse bar $f$, and to each pair a horizontal crank-shaft G is hung. These crank-shafts G are each provided with a pulley $g$, both of the same diameter, the two pulleys being connected by a driving-belt $g'$, whereby they are caused to revolve with equal speed. One of the crank-shafts G is provided with a pinion $g^2$, which gears into another pinion $g^3$ on a driving-shaft $g^4$, hung in a bracket-frame $g^5$ at the side of the trough A. This driving-shaft $g^4$ may receive its motion by means of a pulley $g^6$, and an ordinary belt from a suitable motor, or it may be provided with a hand-crank and turned by hand-power. To the crank portion $g^7$ of the two crank-shafts G hangers $c$ are connected, by which the frame C is suspended.

The frame C consists of two longitudinal bars $c'$, connected by transverse bars $c^2$, and provided with transverse rows of vertical, or nearly so, rake-teeth $c^3$ and an immerser $c^4$. The immerser $c^4$ is made, preferably, with an inclined bottom formed of perforated sheet metal or of wire-gauze, and is fastened to the frame C, preferably in rear of the first two rows of teeth $c^3$, and its submerging-surface $c^5$ is placed below the frame, but not as low as the lower ends of the teeth $c^3$, in order to submerge the wool, but not to hinder the teeth in grasping and propelling the wool, as will be seen. The motion of the frame C, when the cranks are revolving and the teeth $c^3$ are low down, is forward and backward when they are high up or rising, and thus the wool is pushed forward while the teeth describe their lower semicircle, and is at rest when the teeth describe their upper semicircle above it and out of range of the same. The hangers $c$ are rigidly connected to the frame C by means of followers $c^6$, attached to them by means of screws $c^7$, and between the hangers and their respective followers the crank portions $g^7$ are clasped with more or less force, according to the adjustments made by the screws $c^7$. These hangers are long enough to prevent the wool coming in contact with the cranks and being pulled up thereby above the rake-frame C.

The weight of the frame C may be balanced by a counter-weight $c^8$ on each crank-shaft, or by a weighted lever $c^9$, hung to a hook $f^5$ of an arched bar $f$, and connected to the frame by a chain $c^{10}$. One such weighted lever $c^9$ may be attached to each corner of the frame C—that is, two at each end—so as to equally distribute the balancing power. The latter construction has the advantage of relieving the bearings in the hangers of excessive wear due to the weight of the frame and of affording a leverage means for facilitating the lifting of the frame by hand in case of emergency.

To the end of the rake-frame C or to the forward crank-shaft G the delivering-rake frame D is flexibly attached by the crank portion $g^7$ and suitable standards of said frame, or by means of a pin $d$ or other hinging connection. It consists of two longitudinal bars $d'$, and a suitable number, say three, transverse bars $d^2$, provided with rake-teeth $c^3$ in a manner similar to bars $c^2$, excepting that those teeth in the end bar $d^3$ are sloped forward, as shown, in order to easily set free the wool during its forward movement upon the inclined bottom B'. During the greater part of the forward stroke of the frame D the teeth $c^3$ in the end of bar $d^3$ glide upon the bottom B'; but during the end portion of said stroke they become slightly lifted by means of two lugs $d^4$ on the bars $d'$, which lugs rest and move upon two guides $d^5$, fastened to the side walls of the trough. By this operation the wool is permitted to go forward, while the frame D is almost standing still during the change of its stroke. A chain or cord $d^6$ is fastened to a hook $d^7$ on the bar $d^3$, and to a pin or hook $d^8$ on the hanger $c$, as shown. The length of the said chain may be increased or diminished, in order to hold the frame more or less inclined while moving forward and ascending with the frame C, and thus cause the frame D to withdraw its teeth $c^3$ sooner or later from the wool on the inclined bottom B', as the character of the wool may require.

The adjustment of the frame D by means of the chain or cord $d^6$ or other equivalent sustaining means is a very essential feature of my invention, as it secures a more perfect operation with different kinds of wool. Thus a very knotted and compact kind of wool will be delivered without difficulty when the frame D is kept high by a shortened chain or other adjusting device, and a loose and comparatively incoherent kind of wool can be more uniformly delivered when the frame is allowed to keep low down by lengthening the chain. The wool is pushed by the teeth on the bar $d^3$ sufficiently close to the wringing-rollers E to be caught and drawn between them, so that the water or cleansing-liquid can be pressed out. The upper roller E is for that purpose provided with ordinary movable bearings $a^2$, forced down upon the journals of the roller by means of levers $a^3$, fulcrumed at $a^4$ to the trough, and held down by bars $a^5$ and springs $a^6$. The springs $a^6$ are adjusted by means of nuts $a^7$ on rods $a^8$, passed through the bars $a^5$ and fastened to the trough below, as shown. The lower roller E is provided with a pulley $e$, which derives its motion, by means of a belt $e'$, from a pulley $e^2$ (shown in dotted lines in Fig. 3) on the driving-shaft $g^4$.

In the rear of the rollers E two parallel independent rollers $e^3$ are hung to arms $e^4$, projecting from the trough, and between these rollers the wool leaving the wringing-rollers is guided downward into a suitable receptacle or a chute leading to a drying-chamber, (not shown,) the said rollers $e^2$ $e^3$ preventing the wool being caught in its descent from the wringing-rollers over the end portion of the trough.

In front of the trough an ordinary endless apron $e^5$ is provided for depositing the wool previous to its introduction into the trough.

What I claim is—

1. In a wool-washing machine, the frame C, hung to parallel cranks $g^7$, in combination with balancing weighted levers $c^9$ and chain $c^{10}$, substantially as set forth.

2. In a wool-washing machine, the combination of the rake-frame C, cranks $g^7$, hangers $c$, delivering-frame D, connected flexibly directly to the rake-frame C, and adjusting cord or chain $d^6$, substantially as set forth.

In testimony whereof I hereunto affix my signature in presence of two witnesses.

WILLIAM WHITE.

Witnesses:
R. T. SMITH,
S. J. M. SMITH.